United States Patent
Rickard et al.

(10) Patent No.: US 7,702,829 B2
(45) Date of Patent: Apr. 20, 2010

(54) METHOD, SYSTEM, AND COMPUTER PROGRAM PRODUCT FOR READING DATA FROM A STORAGE CONTROLLER IN A STORAGE AREA NETWORK

(75) Inventors: Thomas W. Rickard, Romsey (GB); William J. Scales, Fareham (GB); David A. Sinclair, Winchester (GB); Alistair L. Symon, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 11/753,718

(22) Filed: May 25, 2007

(65) Prior Publication Data

US 2008/0005363 A1 Jan. 3, 2008

(30) Foreign Application Priority Data

May 26, 2006 (GB) ................. 0610474.9

(51) Int. Cl.
- *G06F 3/00* (2006.01)
- *G06F 5/00* (2006.01)
- *G06F 13/12* (2006.01)
- *G06F 13/38* (2006.01)

(52) U.S. Cl. .............. 710/38; 710/59; 710/74
(58) Field of Classification Search ........... 710/59, 710/74, 38
See application file for complete search history.

(56) References Cited

U.S. PATENT DOCUMENTS

| | | | | |
|---|---|---|---|---|
| 5,675,579 A | * | 10/1997 | Watson et al. ............... 370/248 |
| 5,742,792 A | * | 4/1998 | Yanai et al. ................. 711/162 |
| 5,944,838 A | * | 8/1999 | Jantz ............................ 714/6 |
| 6,330,625 B1 | * | 12/2001 | Bridge ......................... 710/39 |
| 6,545,981 B1 | | 4/2003 | Garcia et al. |
| 6,735,636 B1 | * | 5/2004 | Mokryn et al. ................. 710/5 |
| 6,941,396 B1 | * | 9/2005 | Thorpe et al. ................. 710/74 |
| 2004/0093389 A1 | * | 5/2004 | Mohamed et al. .......... 709/212 |
| 2004/0172636 A1 | | 9/2004 | Do et al. |
| 2005/0114286 A1 | | 5/2005 | Bai et al. |
| 2007/0226532 A1 | * | 9/2007 | Matsuda ....................... 714/4 |

\* cited by examiner

*Primary Examiner*—Niketa I Patel
*Assistant Examiner*—Farley J Abad
(74) *Attorney, Agent, or Firm*—Lieberman & Brandsdorfer, LLC

(57) ABSTRACT

This invention relates to a method, system and computer program product for reading data from a storage controller in storage area network. A read data instruction is received from an application requesting data from the storage controller using a primary data path. If the data on the primary data path is not transferred in a defined time interval using the primary data path, data is requested from the storage controller using one or more alternative data paths. Data is received from the storage controller on one of data paths and into a buffer. When the read instruction has completed and that the data is in the buffer, the application is notified. Each data path is associated with a buffer and the data is received into a buffer associated with the path. The application is informed which buffer holds the data and the application accesses the data from this buffer.

18 Claims, 2 Drawing Sheets

METHOD, SYSTEM, AND COMPUTER PROGRAM PRODUCT FOR READING DATA FROM A STORAGE CONTROLLER IN A STORAGE AREA NETWORK

This invention relates to a storage area network (SAN) controller. In particular this invention relates to pre-emptive use of alternative paths by a SAN controller in a SAN.

BACKGROUND

A known Storage Area Network (SAN) controller is the interface between an application host and a storage controller in a SAN network. The SAN controller controls the data signals over a plurality of paths between itself and the storage controller. While the controller may spread I/O activity over some or all of these paths, it will generally select a single path for each individual I/O transmission. If this path is not operational for some reason, the SAN controller and application host must wait for a long period before determining that I/O is not going to complete. Normally the SAN controller will not submit the I/O operation via an alternative path until the original attempt has timed out completely or the interconnecting fabric between the host and the storage controller has told the host that the path is not operational. This is because the controller is unable to tell the difference between an unresponsive path and a disk operation that is simply taking a long time to execute in the storage. This approach imposes a significant performance degradation on the I/Os that are submitted to unresponsive paths. For some applications which require I/Os to be completed within a few seconds this is unacceptable.

Another problem that can occur in SAN systems is with the host submitting the I/O via the selected path and when this I/O does not complete the host submits another I/O via a different path, and this second I/O does complete. The host now gives good completion status to the application and the application de-allocates the buffer associated with the transaction. The original I/O now completes using a buffer that has been de-allocated which could cause significant problems. To avoid this problem, the host (or device driver) must ensure that the host buffer associated with the transaction is not accessed by any late completing I/O activity.

SUMMARY OF INVENTION

In one aspect of the invention, a method is provided to read data from a storage controller in storage area network. A read data instruction is received from an application requesting data from storage controller using a primary data path. Data is requested from the storage controller using an alternative data path if the data is not transferred in a normal transfer time using the primary data path. Data is received from the storage controller on one of the data paths and into a buffer. Upon receipt of data in the buffer, the application is notified that the read instruction has completed and that the data is in the buffer.

In another aspect of the invention, a computer system is provided with a storage area network system with a storage area network processor to request data from a storage controller. First receiving means receives a read data instruction from an application, and first requesting means requests data from the storage controller using a primary data path in response to receipt of said read instruction. Second requesting means requests data from the storage controller using an alternative data path if the data is not transferred in a defined transfer time using the primary data path. Second receiving means receives data from the storage controller on one of the data paths and into a buffer. Notifying means notify the application that the read instruction has completed and that the data is in the buffer.

In yet another aspect of the invention, an article is provided with a tangible computer readable storage media including computer program instructions for requesting data from a storage controller in a storage area network system. Instructions are provided to receive a read data instruction from an application requesting data from the storage controller using a primary data path. Instructions are provided to request data from the storage controller using an alternative data path if the data is not transferred in a defined time interval using the primary data path. In addition, instructions are provided to receive data from the storage controller on one of the data paths and into a buffer, and to notify the application that the read instruction has completed and that the data is in the buffer.

DESCRIPTION OF DRAWINGS

Embodiments of the invention will now be described, by means of example only, with reference to the accompanying drawings in which.

DESCRIPTION OF THE EMBODIMENTS

Figure 1:
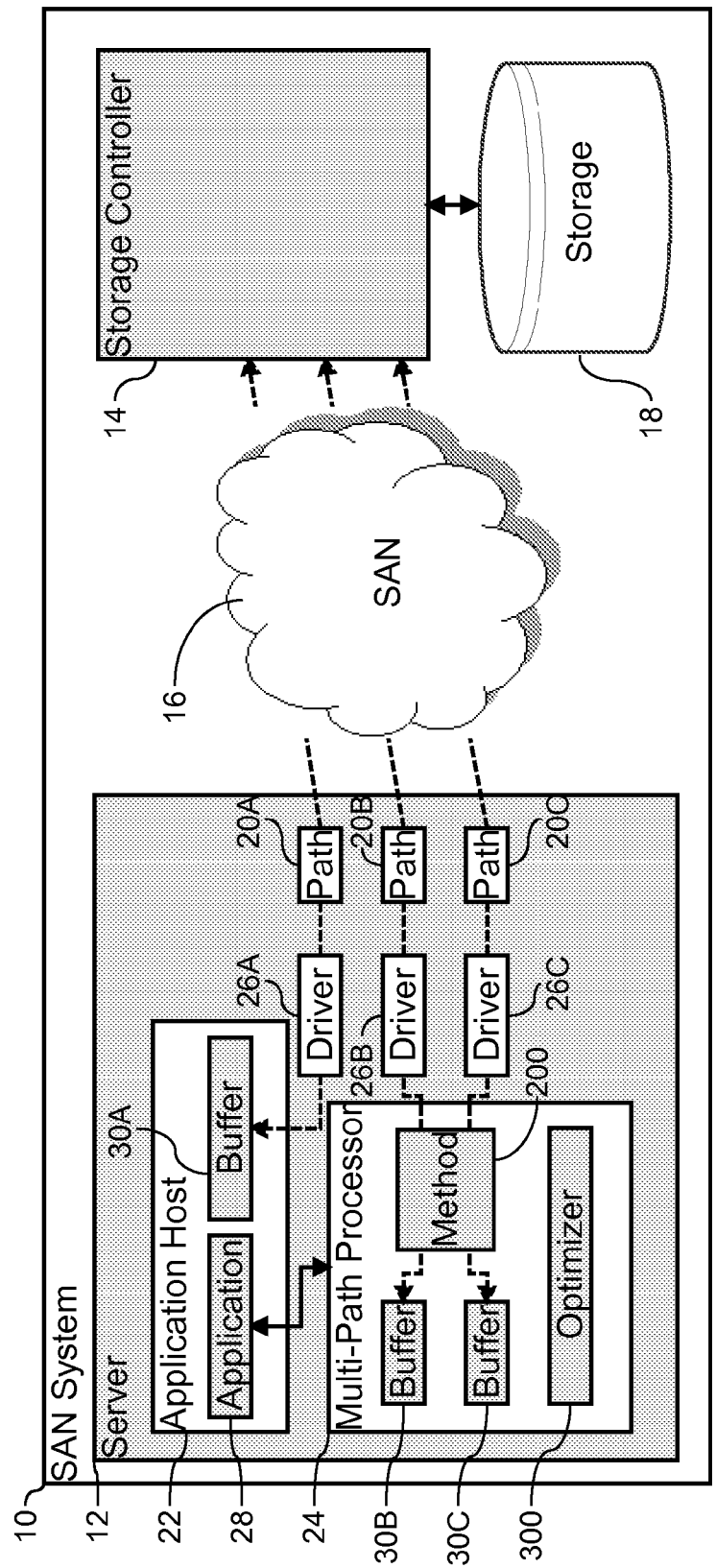
FIG. 1 is a schematic of the preferred embodiment of the invention.
Figure 2:
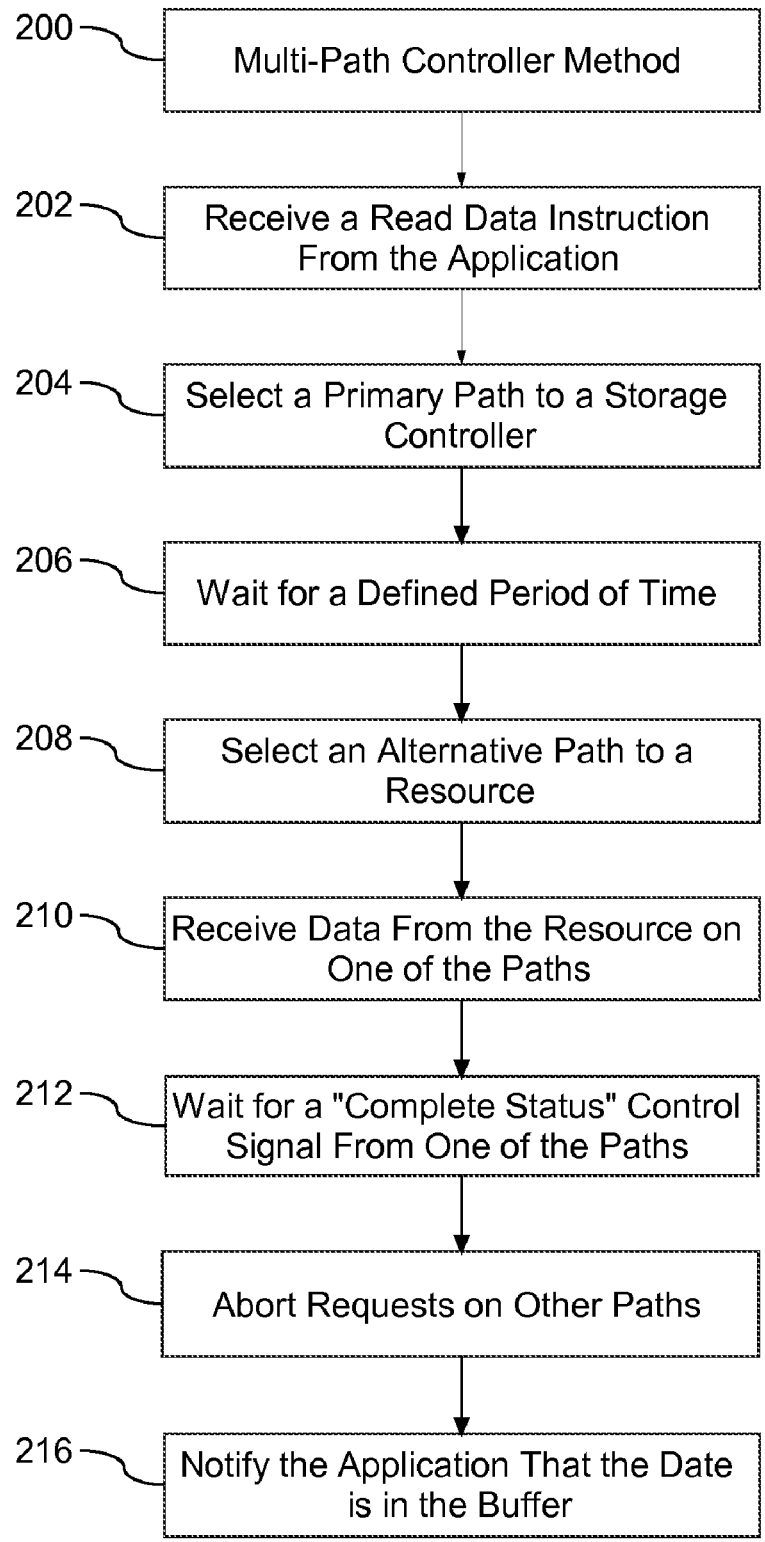
FIG. 2 is a schematic of the method of the multi-path processor of the preferred embodiment.

A preferred embodiment shown in FIGS. 1 and 2 and according to the present invention is storage area network (SAN) system (10) comprising: a server (12) linked by multiple paths to a storage controller (14) through a SAN (16). The storage controller (12) has direct access to the storage (18). In one embodiment, the storage (18) is a hard drive.

The SAN (10) links the storage controller (14) to the server (12) along one of a plurality of paths (20A), (20B) (20C) and any one of the paths can be used by the server to read or write data from the storage controller. The paths are though a network of switches, some switches are faster than others and therefore the time taken through the network on different paths will be different.

The storage controller (14) can receive multiple identical read requests arriving via different paths (20A), (20B), and (20C). A first read request will cause the appropriate data to be loaded into the cache in the storage controller (14) and subsequent reads are then satisfied from this cache and will not have significant impact on performance.

The server (12) comprises: an application host (22); multi-path processor (24); and device drivers (26A), (26B) and (26C).

The application host (22) comprises an application (28) and an application buffer (30A). The application host (22) selects any one of the paths (20A), (20B), and (20C) when it needs to do an I/O transaction with the storage controller. This embodiment relates to read transactions.

Each device driver (26A), (26B), (26C) can make an I/O request to the storage controller over a respective path (20A), (20B), (20C), respectively.

The application (28) is a set of instructions for achieving a business purpose such as a transaction retrieval database, using a set of instructions. One or more of these instructions will be a read instruction executed by the application host.

The application buffer (30A) stores data that is received from the storage controller (14). The application host (22)

executes the application (28) and in particular when the application (28) requires a read operation the application host (22) will execute this instruction and retrieve the data from the storage controller (14) and place it in the application buffer (30A).

The multi-path processor (24) comprises alternative path buffers (30B) and (30C); a multi-path controller method (200) and a path optimizer method (300).

The alternative path buffers (30B) and (30C) are alternative destinations for data sent from the storage controller (14) along alternative paths to the primary path in the SAN. An alternative path buffer is set up for each alternative path.

The multi-path controller method (200) is shown in detail in FIG. 2 and comprises: the following steps:

Receiving a read data instruction from the application host (22) as instructed by the application (28), step (202).

Selecting a primary path (20A) to a storage controller (14), including linking the primary path (20A) to the primary data buffer (30A) and requesting data from storage controller (14) using the primary data path (20A), step (204).

Waiting for a defined period of time, T1 to allow for a normal transfer of data to take place. In one embodiment, the time period, T1, may be set to five seconds. If a normal transfer of data occurs then the rest of the method is not performed. It is preferable that there is a delay because most transfers will occur without problem. A timer is started to count out the defined normal transfer period (e.g. 5 seconds), step (206).

Selecting an alternative path (20B) to a resource, step (208). This includes linking the alternative path (20B) to an alternative data buffer (30B) and requesting data from the storage controller (14) using the alternative data path (20B). It is preferable to set up one additional path but the same technique could apply to a further additional path (20C) if the alternative path (20B) is delayed past a normal transfer period. In theory this technique could be applied to all available paths.

Receiving data from the resource (18) on the primary path or alternative paths and forwarding the data into the respective buffer (30A), (30B) or (30C), step (210).

Waiting for a 'complete status' control signal from one of the paths to indicate a completed transfer when data sent down that path is sent correctly, step (212).

When a completed transfer on one path is indicated then the requests on other paths are optionally aborted, step (214). If neither transfer completes by the time that the timer reaches a further predetermined time, e.g. 30 seconds, then host assumes that the transaction cannot be completed and returns appropriate status, e.g. bad, to the application and does whatever its normal cleanup process is for this scenario.

Notify the application that the read instruction has completed and that the data is in the buffer, step (216). In one embodiment the application is informed which buffer holds the data and the application can use the data directly from this buffer. In an alternative embodiment the data is transferred from an alternative buffer to the primary buffer.

The optimizer method (300) records over more than one retrieval cycle which path is the most successful at receiving the data without delay. The multi-path processor selects the most successful path as the primary path in subsequent retrieval cycles.

For example, a banking application requires a transaction record and makes request for the transaction data.

The multi-path processor (24) receives a read data instruction for the transaction record from the application host.

The multi-path processor selects primary path (20A) as the optimum path and primary data buffer (30A) and makes a request to storage controller (14) using the primary data path (20A).

After 5 seconds, no 'complete signal' has been received due to a delay with a switch in the SAN network and the multi-path processor selects an alternative path (20B) and data buffer (30B). A further request transaction data is made to storage controller (14) but this time using the alternative data path (20B).

The transaction data is received from the resource (18) on the alternative path (20B) into the buffer (30B) and a 'complete status' control signal indicates that the data has been sent down that path correctly.

The requests on other paths are aborted and the application is notified that the transaction data has completed is in the buffer.

The banking application reads the transaction data and is not aware of delays on the primary path.

In summary there is described a method, system and computer program product for reading data from a storage controller in storage area network comprising: receiving a read data instruction from an application; requesting data from storage controller using the primary data path; further requesting data from the storage controller using one or more alternative data paths if the data is not transferred in a normal transfer time using the primary data path; receiving data from the storage controller on one of paths and into a buffer; and notifying the application that the read instruction has completed and that the data is in the buff wherein each path is associated with a buffer and the data is received into a buffer associated with the path. The application is informed which buffer holds the data and the application accesses the data from this buffer.

It will be clear to one skilled in the art that the method of the present invention may suitably be embodied in a logic apparatus comprising logic means to perform the steps of the method, and that such logic means may comprise hardware components or firmware components.

It will be equally clear to one skilled in the art that the logic arrangement of the present invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Advantages Over the Prior Art

This invention improves host performance by detecting read I/Os that are being delayed by an unresponsive network path and submitting these I/Os via alternative paths, before the original I/O has actually timed out. Either the new read I/O will complete in a timely fashion resulting in improved performance, or this new I/O or the original I/O will eventually complete or time out, in which latter case there won't be any performance improvement.

One solution for improving performance associated with a de-allocated buffer is to use a different buffer for each I/O request. When one of the read I/Os completes and the buffer is returned to the application which may want to modify the buffer; data from another read I/O should not be copied into the buffer as this occurs. Many hardware platforms and operating systems cannot cope with two different device drivers transferring to the same memory at the same time. A SCSI device may legitimately transfer bad data to a host and then complete the read I/O indicating a failure has occurred. A single buffer would not distinguish whether the data in the buffer was good or bad if one read returned good data while the other read returned bad data.

Preferably each path is associated with a buffer and the data is received into a buffer associated with the path and advantageously the application is informed which buffer holds the data and the application accesses the data from this buffer. Alternatively the data is transferred from a buffer associated with an alternative path to a buffer associated with the primary path.

The data can be suitably requested from the storage controller using a further alternative data path if the data is not transferred in a normal transfer time using the primary data path or the alternative path.

Advantageously the method waits for a 'complete status' control signal from one of the paths to indicate a completed transfer where data sent down that path is sent correctly.

When a completed transfer on one path is indicated then it is useful that the requests on other paths are aborted.

If a particular alternative path is more successful than the primary path over a number of data requests then that alternative path becomes the primary path.

Alternative Embodiments

It will be appreciated that, although specific embodiments of the invention have been described herein for purposes of illustration, various modifications may be made without departing from the spirit and scope of the invention. In particular, as described above, the embodiments apply generally to storage area networks, but might be most applicable in the subset of networks that do not notify the application host when a path is lost. In ISCSI networks, there is no State Change Notification mechanism so if a path is actually lost, the application host will only find this out after timing out an I/O sent down that path.

In networks that notify the application host when a path is lost there is then no need to pre-emptively use other paths as the application host will know that the I/O has failed via the original path. For example Fibre Channel networks where the fabric manager sends a State Change Notification message. However, the embodiment would cover the case where the path is still apparently connected but is simply unresponsive.

The embodiment will also help improve the performance when the communication channel between the host and the storage controller can drop data and this can only be detected via a relatively long timeout. Examples of such communications channels are class 3 fibre channel (the most common implementation of fibre channel for disk based storage) and ISCSI. For particularly bad communication channels where a significant percentage of data is being dropped choosing an alternative path to the storage controller is also a much better error recovery procedure than simply retrying the command down the same path.

It will be further appreciated that embodiments of the present invention may be provided in the form of a service deployed on behalf of a customer to offer service on demand.

It will also be appreciated that various further modifications to the preferred embodiment described above will be apparent to a person of ordinary skill in the art.

We claim:

1. A method of reading data from a storage controller in a storage area network comprising:
   receiving a read data instruction from an application, requesting data from a storage controller using a primary data path;
   requesting said data from said storage controller using an alternative data path in response to said data not transferring in a normal transfer time using said primary data path, and prior to said data request using said primary data path being timed out;
   receiving said data from said storage controller on one of said paths and into a buffer;
   notifying said application that the read data instruction has completed and that the data is in the buffer;
   waiting for a complete status control signal from one of said data paths indicating a completed transfer of data; and
   aborting the data request on one of said paths when a completed transfer of the data on one path is indicated.

2. The method of claim 1, wherein each path is associated with a buffer and the data is received into a buffer associated with the path, wherein a different buffer is used for each I/O request.

3. The method of claim 2, wherein the step of notifying includes informing the application which buffer holds the data, and further comprising the application accessing the data from an associated buffer.

4. The method of claim 1, further comprising transferring data from a buffer associated with the alternative data path to a buffer associated with the primary data path.

5. The method of claim 1, further comprising reassigning the alternative data path to become said primary data path if said alternative data path is more successful than said primary data path over a number of data requests.

6. A computer system comprising:
first requesting means for requesting data from a storage controller using a primary data path;
second requesting means for requesting said data from said storage controller using an alternative data path if said data is not transferred in a defined transfer time using said primary data path, and prior to said data request using said primary data path being timed out;
a receiving means for receiving said data from said storage controller on one of said data paths and into a buffer;
notifying means for notifying an application that the data is in the buffer, and
a complete status control signal to be communicated from one of said data paths to indicate a completed transfer where said data sent down the one of said data paths is sent correctly, wherein when said completed transfer on one data path is indicated then the request on said alternative the other data path is aborted.

7. The system of claim 6, wherein each path is associated with a buffer and the data is received into a buffer associated with the path.

8. The system of claim 7, wherein the application is informed which buffer holds the data and the application accesses the data from this buffer.

9. The system of claim 6, wherein the data is transferred from a buffer associated with said alternative path to a buffer associated with the primary data path.

10. The system of claim 6, wherein when the alternative data path is more successful than the primary data path over a plurality of data requests then that alternative data path becomes the primary data path.

11. The system of claim 6, further comprising at least two paths to be employed concurrently for the same data request.

12. An article comprising:
a computer readable storage media including computer program instructions for requesting data from a storage controller in a storage area network system, comprising:
receiving a read data instruction requesting data from a storage controller using a primary data path;
requesting said data from said storage controller using an alternative data path if the data is not transferred in a defined time interval using said primary data path, but prior to said data request using said primary data path being timed out;
receiving said data from said storage controller on one of said data paths and into a buffer;
notifying an application that the read data instruction has completed and that the data is in the buffer; and
instructions to wait for a complete status control signal to be communicated from one of said data paths to indicate a completed transfer where said data sent down one of said data paths is sent correctly, and to optionally abort the data request on the other data path upon receipt of said complete status signal.

13. The article of claim 12, wherein each path is associated with a buffer and said data is received into a buffer associated with its path.

14. The article of claim 12, further comprising instructions to transfer data from a buffer associated with said alternative data path to a buffer associated with said primary data path.

15. The article of claim 12, further comprising instructions to assign said alternative data path to become said primary data path if said alternative data path is more successful than said primary data path over a number of data requests.

16. The system of claim 12, wherein at least two are employed concurrently for the same data request.

17. An article comprising:
a tangible computer readable data storage media having computer program instructions stored thereon for requesting data from a storage controller in a storage area network system, comprising:
receiving a read data instruction from an application requesting data from a storage controller using a primary data path;
requesting said data from said storage controller using an alternative data path if the data is not transferred in a defined time interval using said primary data path, but prior to said data request using said primary data path being timed out;
receiving said data from said storage controller on one of said data paths and into a buffer;
notifying the application that the read data instruction has completed and that the data is in the buffer; and
aborting the data request on one of said data paths following notification of a completed transfer on one data path.

18. The method of claim 1, wherein at least two paths are employed concurrently for the same data request.

* * * * *